United States Patent [19]
Walters

[11] Patent Number: 5,584,501
[45] Date of Patent: Dec. 17, 1996

[54] VEHICLE OCCUPANT RESTRAINT APPARATUS

[75] Inventor: Gary A. Walters, Mesa, Ariz.

[73] Assignee: TRW Inc., Lyndhurst, Ohio

[21] Appl. No.: 528,794

[22] Filed: Sep. 15, 1995

[51] Int. Cl.⁶ .................................................. B60R 21/16
[52] U.S. Cl. .................... 280/728.2; 280/731; 74/552
[58] Field of Search ............................. 280/728.2, 731; 74/491, 552

[56] References Cited

U.S. PATENT DOCUMENTS

| | | | |
|---|---|---|---|
| 3,525,536 | 8/1970 | Pruneski | 280/731 |
| 3,907,330 | 9/1975 | Kondo et al. | 280/731 |
| 3,984,126 | 10/1976 | Goetz et al. | 280/740 |
| 4,828,286 | 5/1989 | Föhl | 280/731 |
| 4,960,292 | 10/1990 | Sadler | 280/731 |
| 4,968,057 | 11/1990 | Rafferty | 280/731 |
| 5,178,409 | 1/1993 | Hiramitsu et al. | 280/731 |
| 5,207,544 | 4/1993 | Yamamoto et al. | 411/348 |
| 5,257,816 | 11/1993 | Sugimoto et al. | 280/735 |
| 5,277,442 | 1/1994 | Cuevas | 280/731 |
| 5,333,897 | 8/1994 | Landis et al. | 280/728.2 |
| 5,356,173 | 10/1994 | Hongou et al. | 280/728.2 |
| 5,419,585 | 5/1995 | Breed et al. | 280/731 |
| 5,470,099 | 11/1995 | Williams | 280/728.2 |

FOREIGN PATENT DOCUMENTS 2282574  4/1995  United Kingdom.

*Primary Examiner*—Kenneth R. Rice
*Attorney, Agent, or Firm*—Tarolli, Sundheim, Covell, Tummino & Szabo

[57] ABSTRACT

A vehicle occupant restraint apparatus (10) includes a vehicle steering wheel unit (12) and fasteners (16) which fasten the steering wheel unit (12) in an installed position on a vehicle steering column (14). The steering wheel unit (12) includes parts which are attached to each other separately from the steering column (14). The attached parts of the steering wheel unit (12) include a steering wheel armature (50), an inflatable vehicle occupant restraint (22), an inflator (20) for inflating the restraint (22), and a cover (40) for covering the restraint (22) and the inflator (20) on the armature (50). The fasteners (16) snap into a locked condition to establish a mechanical interlock between the steering wheel unit (12) and the steering column (14) when the steering wheel unit (12) is moved to its installed position on the steering column (14).

15 Claims, 5 Drawing Sheets

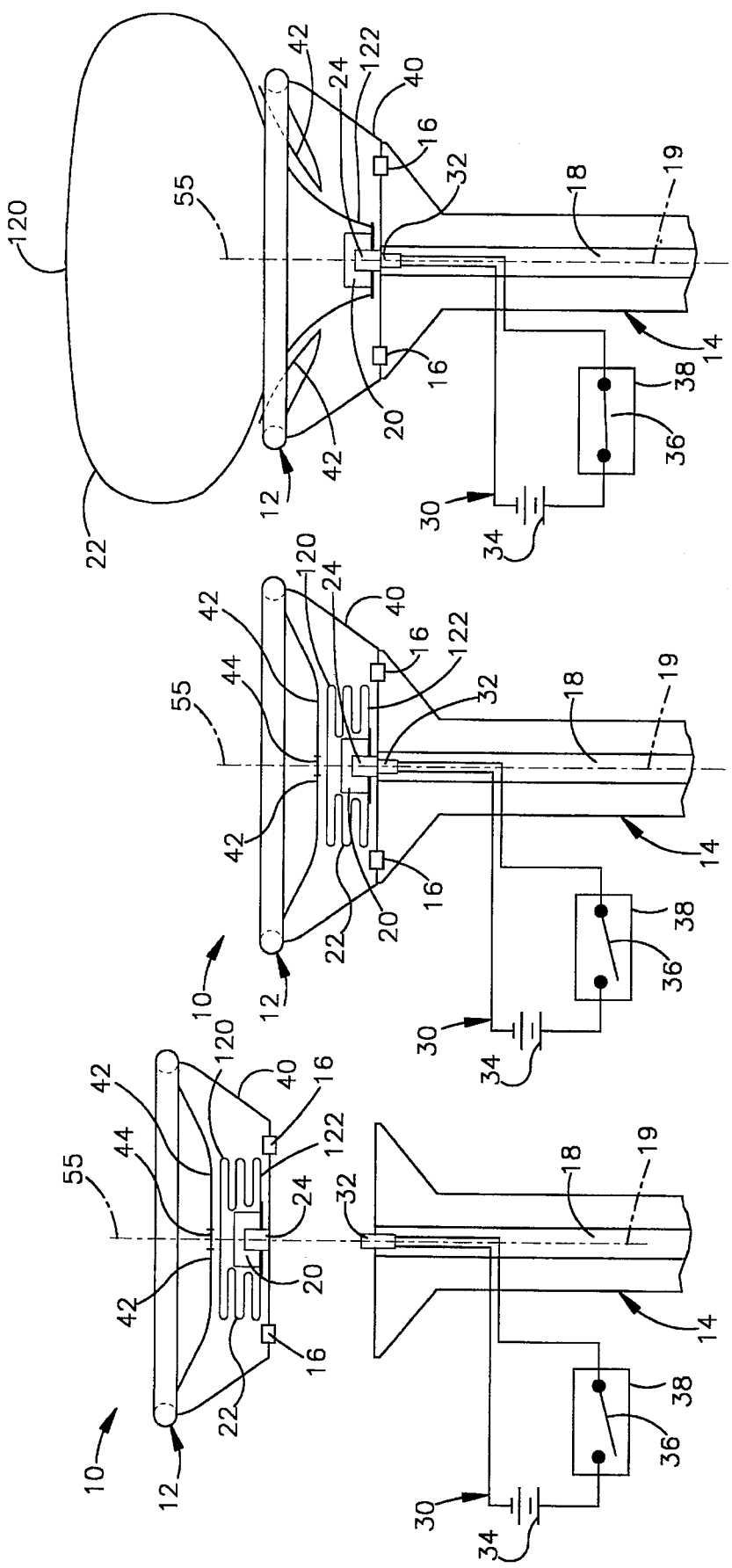

VEHICLE OCCUPANT RESTRAINT APPARATUS

FIELD OF THE INVENTION

The present invention relates to an apparatus for restraining an occupant of a vehicle, and particularly relates to an apparatus including an inflatable vehicle occupant restraint for restraining a driver of a vehicle.

BACKGROUND OF THE INVENTION

An inflatable vehicle occupant restraint, such as an air bag, is inflated to protect an occupant of a vehicle upon the occurrence of a vehicle collision. The air bag is part of a vehicle occupant restraint system which further includes a collision sensor and an inflator. The collision sensor senses vehicle conditions which indicate the occurrence of a collision. When the collision sensor senses a collision-indicating condition of at least a predetermined threshold level, the inflator is actuated. The inflator then emits inflation fluid which inflates the air bag into the vehicle occupant compartment to restrain an occupant of the vehicle from forcefully striking parts of the vehicle as a result of the collision.

An air bag and an inflator are typically assembled together as parts of an air bag module which is separate from the collision sensor. In addition to the air bag and the inflator, the module includes a deployment door or cover which extends over the air bag and the inflator to conceal those parts of the module from the vehicle occupant compartment. When the inflation fluid emitted from the inflator begins to inflate the air bag, it moves the air bag forcefully outward against the deployment door. The deployment door is ruptured by the force of the fluid pressure in the air bag, and is moved out of the path of the air bag as the inflation fluid continues to inflate the air bag outward into the vehicle occupant compartment.

An air bag module is located in the vehicle adjacent to the vehicle occupant compartment, such as in the instrument panel or on the steering column. When the module is located on the steering column, it is attached to the steering wheel on the steering column. An electrical connector on the module is coupled with an electrical connector on the steering column so as to connect the inflator with the collision sensor in an electrical circuit which is routed through the steering column.

SUMMARY OF THE INVENTION

In accordance with the present invention, a vehicle occupant restraint apparatus for use with a vehicle steering column comprises a steering wheel unit. The steering wheel unit is an assembled unit of parts which are attached to each other separately from the steering column. The attached parts of the steering wheel unit include a steering wheel structure, an inflatable vehicle occupant restraint, and inflator means for inflating the restraint. The attached parts of the steering wheel unit also include cover means for covering the restraint and the inflator means on the steering wheel structure.

The apparatus further comprises fastener means for fastening the steering wheel unit in an installed position on the steering column. The fastener means snaps into a locked condition to establish a mechanical interlock between the steering wheel unit and the steering column when the steering wheel unit is moved to its installed position.

In a preferred embodiment of the present invention, the inflator means includes a first electrical connector in a predetermined position on the steering wheel unit. The apparatus further comprises collision sensor means with a second electrical connector in a predetermined position on the steering column. When the steering wheel unit is being moved toward its installed position on the steering column, the fastener means engages the steering column so as to guide the first and second electrical connectors into alignment with each other. The first electrical connector is then coupled with the second electrical connector so as to connect the inflator means in an electrical circuit with the collision sensor means when the steering wheel unit reaches its installed position on the steering column. Accordingly, the inflator means on the steering wheel unit is connected with the steering column both mechanically and electrically by merely snapping the steering wheel unit in place on the steering column without any additional manipulation of mechanical fasteners and/or electrical couplings.

In the preferred embodiment of the present invention, the cover means is a single, continuous piece of plastic material which extends along and around the rim and the spokes on the steering wheel structure. The continuous piece of plastic material further extends over the restraint, and defines a deployment door for the restraint. The deployment door has a boundary structure which ruptures upon inflation of the restraint. An outer surface of the cover means extends continuously and seamlessly over the boundary structure to conceal the boundary structure from view. The cover means thus extends over the other parts of the steering wheel unit to cover and conceal them from view in the vehicle.

DESCRIPTION OF A PREFERRED EMBODIMENT

A vehicle occupant restraint apparatus 10 comprising a preferred embodiment of the present invention is shown schematically in FIGS. 1–3. The apparatus 10 includes a vehicle steering wheel unit 12 and a vehicle steering column 14. The steering wheel unit 12 is an assembled unit of parts which are attached to each other separately from the steering column 14, as shown in FIG. 1. As shown in FIG. 2, the steering wheel unit 12 is received in an installed position on the steering column 14. The apparatus 10 also includes fasteners 16 for fastening the steering wheel unit 12 to the steering column 14. When the steering wheel unit 12 is fastened in its installed position on the steering column 14, it is coupled to a steering shaft 18 in the steering column 14 for rotation about an axis 19 with the shaft 18.

The parts of the steering wheel unit 12 include an inflator 20 and a particular type of inflatable vehicle occupant restraint 22 which is commonly referred to as an air bag. The air bag 22 is inflatable from a folded, uninflated condition, as shown in FIGS. 1 and 2, to an unfolded, inflated condition, as shown in FIG. 3. When the air bag 22 is being inflated, it moves toward the driver of the vehicle. The air bag 22 then restrains movement of the driver toward the steering wheel unit 12 to help protect the driver from a forceful impact with the steering wheel unit 12 or other parts of the vehicle.

BRIEF DESCRIPTION OF THE DRAWINGS

The present invention will become apparent to those skilled in the art to which the present invention relates from reading the following description with reference to the accompanying drawings, in which:

FIG. 1 is a schematic view of a vehicle occupant restraint apparatus comprising a preferred embodiment of the present invention, with the apparatus being shown in a partially assembled condition;

FIG. 2 is a view showing the apparatus of FIG. 1 in an assembled condition;

FIG. 3 is a view showing the apparatus of FIG. 2 in an actuated condition;

Figure 4:
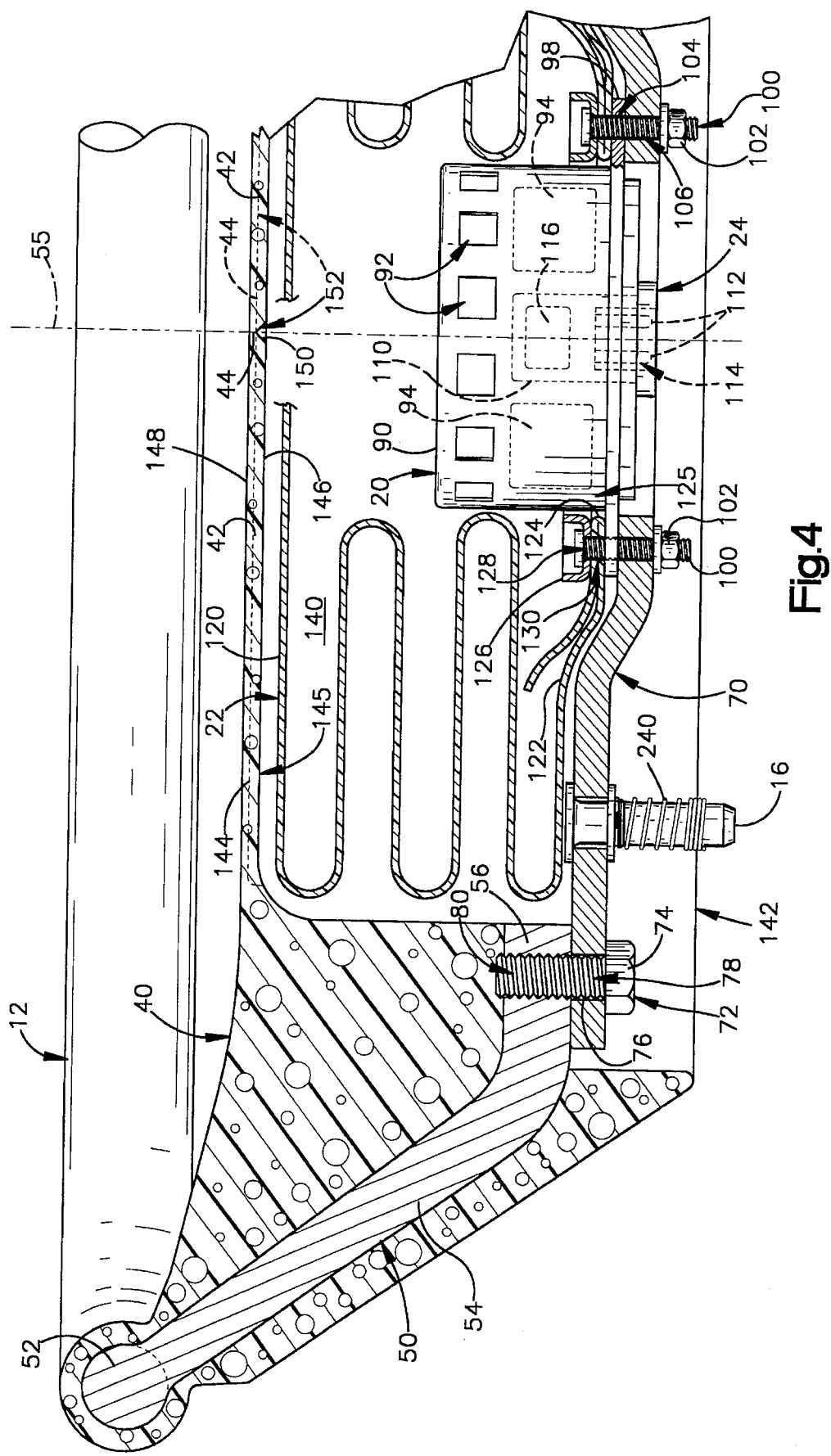
FIG. 4 is an enlarged partial view of parts of the apparatus of FIG. 1.

The inflator 20 comprises a source of inflation fluid for inflating the air bag 22. As known in the art, the inflator 20 may contain an ignitable gas generating material for generating a large volume of gas. The inflator 20 may alternatively contain a stored quantity of pressurized inflation fluid, or a combination of pressurized inflation fluid and ignitable material for heating the inflation fluid.

When the steering wheel unit 12 is fastened in the installed position of FIG. 2, the inflator 20 is included in an electrical circuit 30. Specifically, the inflator 20 has an electrically actuatable initiator 24 which, when actuated, initiates a flow of inflation fluid from the inflator 20. The initiator 24 is coupled with an electrical connector 32 on the steering column 14. The electrical connector 32 is included in the circuit 30 with a power source 34 and a normally open switch 36. The power source 34 is preferably the vehicle battery. The switch 36 is part of a sensor 38 which senses a condition indicating the occurrence of a vehicle collision. Such a condition may comprise, for example, sudden vehicle deceleration caused by a collision. If the collision-indicating condition is above a predetermined threshold level, it indicates the occurrence of a collision for which inflation of the air bag 22 is desired to restraint movement of the driver of the vehicle, as described above. The sensor 38 then closes the switch 36, and electric current is directed through the initiator 24 to actuate the initiator 24. As a result, the inflator 20 rapidly emits a large volume of inflation fluid which flows into the air bag 22 to inflate the air bag 22.

Another part of the steering wheel unit 12 is a cover 40 which encloses the air bag 22 and the inflator 20 within the steering wheel unit 12. The cover 40 includes a pair of deployment door panels 42 which extend over the air bag 22. The deployment door panels 42 are held in closed positions, as shown in FIGS. 1 and 2, by a rupturable section 44 of the cover 40. As the inflation fluid emitted from the inflator 20 begins to inflate the air bag 22, it moves the air bag 22 forcefully outward against the cover 40. The air bag 22 then ruptures the rupturable section 44 of the cover 40 and moves the deployment door panels 42 pivotally outward, as shown in FIG. 3. As the inflation fluid continues to inflate the air bag 22, it moves the air bag 22 outward from the cover 40 past the deployment door panels 42.

Figure 5:
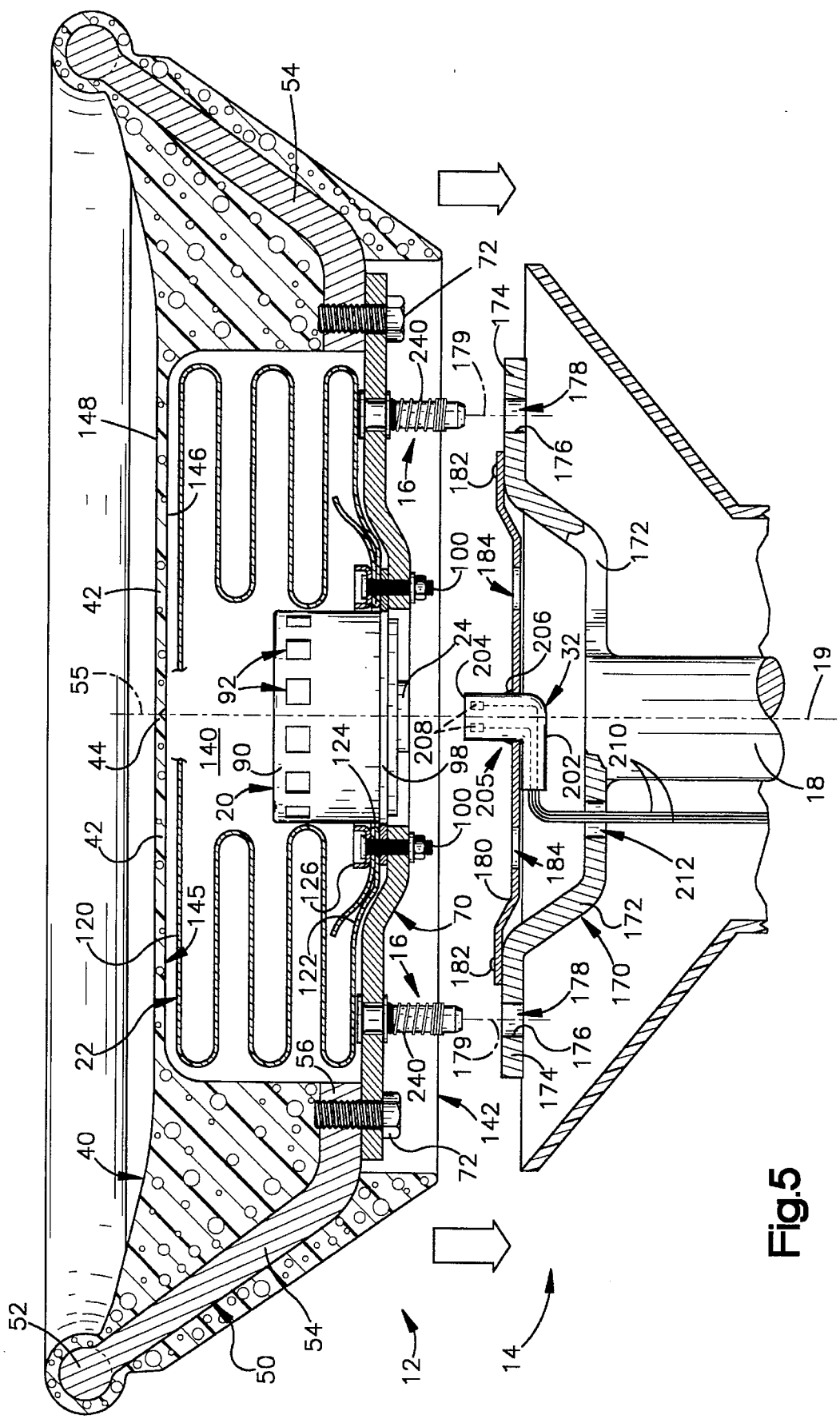
FIG. 5 is an enlarged view showing other parts of the apparatus of FIG. 1.
Figure 6:
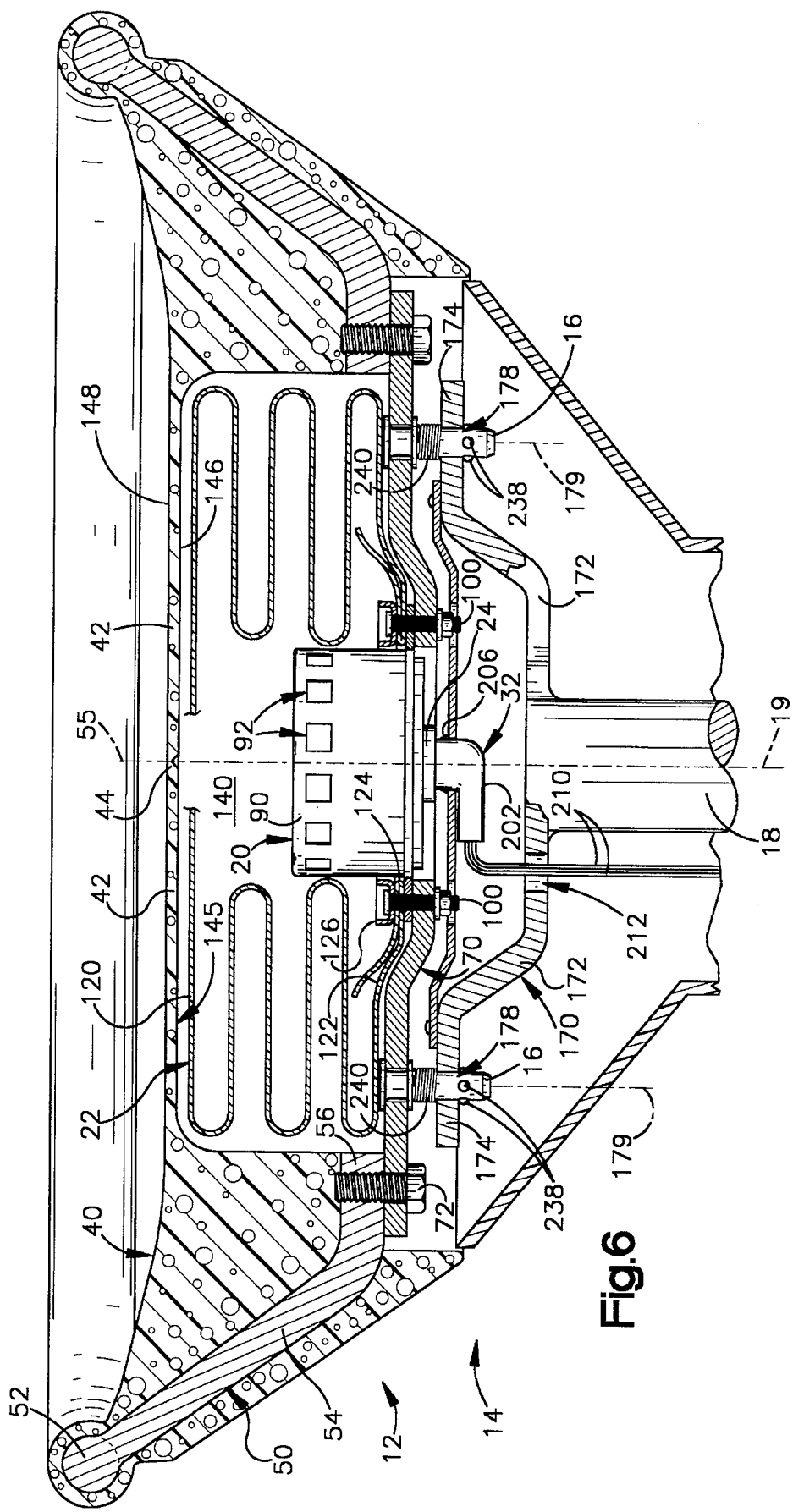
FIG. 6 is a view showing the parts of FIG. 5 in an assembled relationship.

As shown in greater detail of FIGS. 4–6, the parts of the steering wheel unit 12 further include a steering wheel armature 50. The armature 50 is a metal structure with a rim 52 and spokes 54. The rim 52 has a circular shape centered on an axis 55. Each spoke 54 extends from the rim 52 toward the axis 55 in a generally radial direction, and has a radially inner end portion 56 which is spaced axially downward from the rim 52, as viewed in FIGS. 4–6.

The armature 50 includes a base plate 70 which functions as a hub for the rim 52 and the spokes 54. The base plate 70 also functions as a reaction plate which supports the inflator 20 on the armature 50, as described fully below. The inner end portions 56 of the spokes 54 are fixed to the base plate 70 by corresponding fasteners, such as bolts 72. Each bolt 72 has a head 74 (FIG. 4) abutting the base plate 70, and has a threaded neck 76 projecting upward through aligned apertures 78 and 80 in the base plate 70 and the corresponding spoke 54, respectively. The surface of the spoke 54 which defines the aperture 80 is threaded so that it engages the threaded neck 76 of the bolt 72.

In the preferred embodiment of the present invention shown in the drawings, the inflator 20 comprises a gas generator with a short cylindrical housing 90 centered on the axis 55. The housing 90 has a plurality of gas outlet openings 92, and contains an ignitable gas generating material 94 (FIG. 4) which, when ignited, rapidly generates a large volume of gas for inflating the air bag 22. The gas generating material 94 may have any suitable composition and configuration known in the art. An annular mounting flange 98 projects radially from the housing 90 near one end of the housing 90. The inflator 20 is mounted on the armature 50 by a plurality of fasteners, such as bolts 100 with nuts 102, which extend through aligned apertures 104 and 106 in the mounting flange 98 and the base plate 70, respectively. The base plate 70 thus functions as a reaction plate for supporting the inflator 20 on the armature 50, as noted above.

The initiator 24 has an elongated cylindrical casing 110 extending upward, as viewed in the drawings, into the inflator housing 90 along the axis 55. The initiator 24 further has a pair of electrodes 112 in a compartment 114 which is open at the lower end of the casing 110. A pyrotechnic material 116 is contained in the casing 110, and is ignited in a known manner upon the passage of electric current through the initiator 24 between the electrodes 112. When the pyrotechnic material 116 is ignited, it produces combustion products which rupture and emerge from the casing 110 to ignite the gas generating material 94 in the housing 90. Like the gas generating material 94, the pyrotechnic material 116 may have any suitable composition and configuration known in the art.

In the schematic views of FIGS. 1–3, the air bag 22 is shown to have a major portion 120 and an inlet portion 122. When the air bag 22 is inflated from the condition of FIG. 2 to the condition of FIG. 3, the major portion 120 of the air bag 22 moves outward from the cover 40 toward the driver of the vehicle. The inlet portion 122 of the air bag 22 is retained within the cover 40 with the inflator 20.

As shown in FIG. 4, the inlet portion 122 of the air bag 22 has a folded edge 124 defining an inlet opening 125. The inflator housing 90 extends axially upward into the air bag 22 through the inlet opening 125. The mounting flange 98 extends radially outward from the inlet opening 125 beneath the inlet portion 122 of the air bag 22. A retainer ring 126 extends around the housing 90 above the inlet portion 122 of the air bag 22. The bolts 100 extend through aligned apertures 128 and 130 in the retainer ring 126 and the inlet portion 122 of the air bag 22, respectively. The bolts 100 and the nuts 102 thus retain the inlet portion 122 of the air bag 22 securely between the retainer ring 126 and the mounting flange 98.

The cover 40 is a unitary part, and is defined by a single, continuous piece of plastic material. The cover 40 could alternatively be defined by two or more continuous pieces of plastic material that are joined together as a unitary part. Such pieces of plastic material could comprise, for example, layers including a compressible substrate layer and an incompressible trim layer bonded to the substrate layer. However, the cover 40 in the preferred embodiment of the present invention is a single, continuous piece of plastic material having a compressible structure, and is most preferably a single, continuous piece of urethane foam.

As shown in FIG. 4, the cover 40 extends along and around the rim 52 and the spokes 54 to conceal those parts of the armature 50 from view from above or beside the steering wheel unit 12. The cover 40 can be formed in this configuration by any suitable molding process known in the art. The cover 40 also conceals the air bag 22 and the inflator 20 from view from above or beside the steering wheel unit 12. Specifically, the cover 40 defines a chamber 140 with an open lower end 142. The air bag 22 and the inflator 20 are located in the chamber 140. A panel portion 144 of the cover 40 defines a closed upper end 145 of the chamber 140, and thus extends over the air bag 22 and the inflator 20 in the chamber 140. In accordance with this feature of the present invention, the air bag 22 and the inflator 20 are first fastened to the base plate 70, as described above, and are subsequently moved with the base plate 70 into the chamber 140 through the open lower end 142 of the chamber 140. The base plate 70, the inflator 20, and the air bag 22 are then fastened to the spokes 54 by the bolts 72 and the welds 82.

The panel portion 144 of the cover 40 has oppositely facing inner and outer side surfaces 146 and 148. A recessed portion 150 (FIG. 4) of the inner side surface 146 defines a notch 152. The rupturable section 44 of the cover 40 comprises the relatively thin plastic material of the panel portion 144 which is located between the notch 152 and the outer side surface 148. As indicated in dashed lines in FIG. 4, the notch 152 and the rupturable section 44 of the cover 40 extend together so as to define rupturable boundaries of the deployment door panels 42. The rupturable section 44 preferably extends in an H-shaped configuration extending along three sides of each of the two deployment door panels 42. However, the rupturable section 44 could extend in any other suitable configuration in accordance with a correspondingly different configuration and/or number of deployment door panels. For example, the cover 40 could alternatively include a single deployment door panel bounded on three sides by a U-shaped rupturable section of the cover 40. In any case, the contour of the outer side surface 148 is preferably not affected by the notch 152. The outer side surface 148 thus extends continuously and seamlessly across the rupturable section 44 so as to conceal the boundaries of the deployment door panels 42 from view.

Parts of the steering column 14 are shown in greater detail in FIGS. 5 and 6. An upper end portion 170 of the steering shaft 18 has a plurality of radially projecting arms 172. Each arm 172 has a radially outer end portion 174 with a cylindrical inner surface 176. The cylindrical inner surfaces 176 define corresponding bores 178, each of which is centered on a corresponding axis 179 parallel to the axis 19. A mounting plate 180 extends across the outer end portion 170 of the steering shaft 18 between the arms 172, and is fixed to the arms 172 by fasteners 182. A plurality of apertures 184, two of which are shown in FIGS. 5 and 6, extend through the mounting plate 180 at locations corresponding to the locations of the bolts 100 on the steering wheel unit 12.

The connector 32 in the electrical circuit 30 (FIGS. 1–3) is supported on the mounting plate 180 as shown in FIG. 4. The connector 32 has a plastic casing 202 with an upper portion 204. The upper portion 204 of the casing 202 is received closely through an aperture 205 at the center of the mounting plate 180, and is centered on the axis 19. A plurality of wedge shaped locking tabs 206 on the casing 202 retain the connector 32 on the mounting plate 180.

The connector 32 has a pair of electrical contacts 208 inside the casing 202, and has a corresponding pair of lead wires 210 extending outward from the casing 202. The lead wires 210 are directed through a corresponding aperture 212 in one of the arms 172, and are directed further through the steering column 14 to the other parts of the electrical circuit 30.

Figure 8:
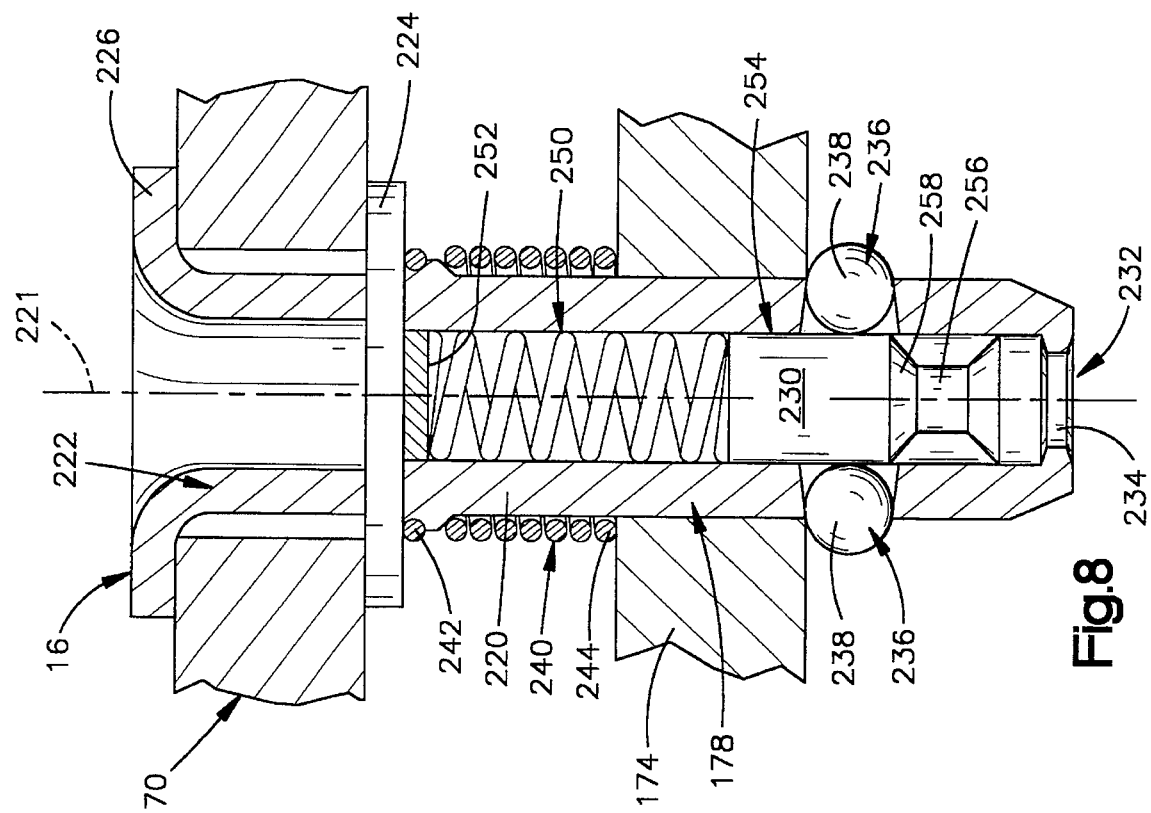
FIG. 8 is a view showing the parts of FIG. 7 in an assembled relationship with another part shown in FIGS. 4–6.
Figure 7:
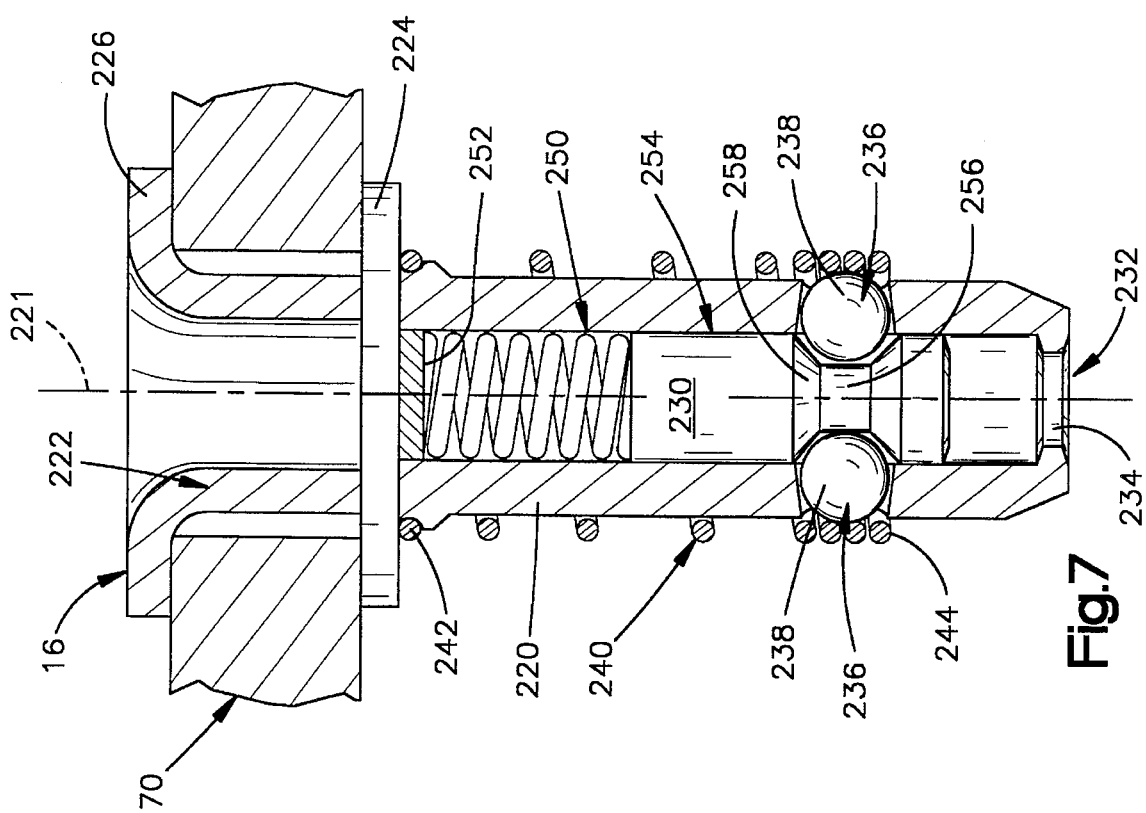
FIG. 7 is an enlarged view of parts shown in FIGS. 4–6.

The fasteners 16, which are shown schematically in FIGS. 1–3, are preferably alike, with each fastener 16 having the structure shown in detail in FIGS. 7 and 8. Accordingly, each fastener 16 is substantially similar to a fastener which is known as a QRI Fastener, and which is available from the Fastener Division of Rexnord Corporation, Milwaukee, Wis.

As shown in FIGS. 7 and 8, each fastener 16 has an elongated tubular body 220 with a longitudinal central axis 221. The tubular body 220 is received through, and projects downward from, a corresponding circular aperture 222 in the base plate 70 on the steering wheel unit 12. An annular flange 224 projects radially from the tubular body 220. The flange 224 and a swaged upper end portion 226 of the tubular body 220 abut respective opposite sides of the base plate 70 so as to fix the fastener 16 to the base plate 70. Each fastener 16 is thus supported in a position in which the axis 221 of the fastener 16 is parallel to the axis 55 (FIG. 5) of the steering wheel unit 12. Welds (not shown) also may be used to secure the fasteners 16 in position on the base plate 70.

The tubular body 220 of each fastener 16 defines an elongated cylindrical bore 230 with an open lower end 232. An annular shoulder portion 234 of the tubular body 220 projects radially inward at a location near the open lower end 232 of the bore 230. A plurality of tapered passages 236, two of which are shown in FIGS. 7 and 8, extend radially outward through the tubular body 220. The passages 236 are equally spaced from the open lower end 232 of the bore 230, and are spaced from each other circumferentially about the axis 221. A corresponding plurality of locking balls 238 are received in the passages 236. The locking balls 238 are movable in the passages 236 radially between the positions in which they are shown in FIGS. 7 and 8.

An external coil spring 240 extends closely over the tubular body 220. An upper end 242 of the external coil spring 240 is fixed to the tubular body 220 adjacent to the flange 224. A lower end 244 of the external coil spring 240 is movable axially toward the upper end 242 upon compression of the external coil spring 240. An internal coil spring 250 extends between a plug 252 and a shaft 254 in the bore 230. The internal coil spring 250 exerts an axially directed bias which urges the shaft 254 to slide downward in the bore 230.

When the shaft 254 is in the position of FIG. 7, a reduced diameter section 256 of the shaft 254 is located axially adjacent to the locking balls 238 in the passages 236. The locking balls 238 then project radially inward of the bore 230 beside the reduced diameter section 256 of the shaft 254. The external coil spring 240 blocks movement of the locking balls 238 radially outward in the passages 236 such that the locking balls 238, in turn, block movement of the shaft 254 along the axis 221.

The steering wheel unit 12 is moved axially downward toward its installed position on the steering column 14, as indicated by the arrows shown in FIG. 5. The tubular bodies 220 of the fasteners 16 are then received closely within the bores 178 in the radial arms 172 on the steering shaft 18, and are moved axially downward through the bores 178. This causes the external coil springs 240 on the fasteners 16 to become compressed against the radial arms 172. The lower end 244 of each external coil spring 240 is thus moved upward past the corresponding locking balls 238.

When a fastener 16 reaches the position of FIG. 8, the internal coil spring 250 slides the shaft 254 downward so that a ramp surface 258 on the shaft 254 pushes the locking balls 238 radially outward until they are stopped by the outer ends of the tapering surfaces that define the tapered passages 236. The internal coil spring 250 then holds the shaft 254 downward against the shoulder 234 so that the shaft 254 will block the locking balls 238 from moving radially inward. The fasteners 16 are thus snapped into locked conditions in which the locking balls 238 block removal of the fasteners 16, and hence the steering wheel unit 12, from the radial arms 172 on the steering column 14.

In accordance with a particular feature of the present invention, the axes 221 of the fasteners 16 are parallel to the axes 179 (FIG. 5) of the bores 178 on the steering column 14, and are thus parallel to the axis 19 of the steering column 14. The fasteners 16 thus guide the steering wheel unit 12 to move toward the steering column 14 in coaxial alignment with the steering column 14 when the fasteners 16 are moved through the bores 178. Therefore, the initiator 24 and the electrical connector 32, which are centered on the axes 55 and 19, respectively, move relatively toward each other in coaxial alignment with each other. When the steering wheel unit 12 reaches its installed position on the steering column 14, the electrodes 112 in the initiator 24 engage the electrical contacts 208 in the connector 32. The initiator 24 thus becomes electrically coupled with the connector 32 automatically upon movement of the steering wheel unit 12 to its installed position on the steering column 14.

From the above description of the invention, those skilled in the art will perceive improvements, changes and modifications. For example, the fasteners 16 in the preferred embodiment of the invention are fixed to the steering wheel unit 12 and project from the steering wheel unit 12 toward the steering column 14. The fasteners 16 could alternatively be fixed to the steering column 14 so as to project from the steering column 14 toward the steering wheel unit 12. The initiator 24 and the electrical connector 32 could be offset together from the center of the inflator 20 and/or from the axes 19 and 55. The axis 55 could be offset from the axis 19. Additionally, an assembly of parts for actuating a vehicle horn can be mounted in or on the cover 40. Such an assembly can have any suitable structure known in the art. Vehicle name labels or the like also can be mounted in or on the cover 40. The cover 40 in the preferred embodiment of the present invention would still consist of a single, continuous piece of plastic material which functions to conceal the air bag 22, the inflator 20, and the armature 50 from view in the manner described above. Such improvements, changes and modifications within the skill of the art are intended to be covered by the appended claims.

Having described the invention, the following is claimed:

1. Apparatus for use with a vehicle steering column, said apparatus comprising:

a steering wheel unit comprising a plurality of parts which are attached to each other separately from the steering column, said parts including a vehicle steering wheel structure, an inflatable vehicle occupant restraint, inflator means for inflating said restraint, and cover means for covering said restraint and said inflator means on said steering wheel structure; and fastener means for fastening said steering wheel unit in an installed position on the steering column, said fastener means snapping into a locked condition to establish a mechanical interlock between said steering wheel unit and the steering column upon movement of said steering wheel unit to said installed position.

2. Apparatus as defined in claim 1 wherein said inflator means includes a first electrical connector in a predetermined position on said steering wheel unit, said apparatus further comprising an electrical power source with a second electrical connector in a predetermined position on the steering column, said first electrical connector being moved into engagement with said second electrical connector so as to become electrically coupled with said second electrical connector upon said movement of said steering wheel unit to said installed position.

3. Apparatus as defined in claim 2 wherein said fastener means guides said first and second electrical connectors into alignment with each other upon movement of said steering wheel unit toward said installed position.

4. Apparatus as defined in claim 1 wherein said cover means comprises a unitary cover part which extends along and around spoke portions of said steering wheel structure to cover said spoke portions, said cover part further extending over said restraint to cover said restraint.

5. Apparatus as defined in claim 4 wherein said cover part defines a deployment door with a boundary structure which ruptures upon inflation of said restraint, said cover part having outer surface means for concealing said boundary structure from view.

6. Apparatus as defined in claim 4 wherein said cover part further extends along and around a rim portion of said steering wheel structure to cover said rim portion.

7. Apparatus as defined in claim 6 wherein said cover part is a single continuous piece of cover material.

8. Apparatus as defined in claim 7 wherein said cover material is a plastic material.

9. Apparatus as defined in claim 8 wherein said plastic material has a compressible structure.

10. Apparatus as defined in claim 9 wherein said plastic material is urethane foam.

11. Apparatus for use with a vehicle steering column, said apparatus comprising:

a vehicle steering wheel structure including a rim and spokes;

an inflatable vehicle occupant restraint;

inflator means for inflating said restraint;

first fastener means for fastening said restraint and said inflator means to said steering wheel structure;

plastic cover means for extending over said restraint to cover said restraint and said inflator means on said steering wheel structure, said plastic cover means consisting of a single, continuous piece of plastic material which extends over said restraint to cover said restraint and said inflator means, said piece of plastic material further extending along and around said rim and said spokes to cover said rim and said spokes; and second fastener means for fastening said steering wheel structure in an installed position on the steering column, said second fastener means snapping into a locked condition to establish a mechanical interlock between said steering wheel structure and the steering column upon movement of said steering wheel structure to said installed position.

12. Apparatus as defined in claim 11 wherein said piece of plastic material defines a deployment door with a boundary structure which ruptures upon inflation of said restraint, said piece of plastic material having outer surface means for concealing said boundary structure from view.

13. Apparatus as defined in claim 11 wherein said piece of plastic material has a compressible structure.

14. Apparatus as defined in claim 13 wherein said plastic material is urethane foam.

15. Apparatus as defined in claim 11 wherein said inflator means includes a first electrical connector in a predetermined position relative to said steering wheel structure, said apparatus further comprising an electrical power source with a second electrical connector in a predetermined position on the steering column, said fastener means guiding said first electrical connector to move into engagement with said second electrical connector so as to become electrically coupled with said second electrical connector upon movement of said steering wheel structure to said installed position.

* * * * *